United States Patent [19]

Tolnai

[11] 4,064,904

[45] Dec. 27, 1977

[54] WASHERLESS CARTRIDGE VALVE FOR FAUCETS

[75] Inventor: Julius L. Tolnai, Los Angeles, Calif.

[73] Assignee: Price Pfister Brass Mfg. Co., Pacoima, Calif.

[21] Appl. No.: 682,180

[22] Filed: Apr. 30, 1976

[51] Int. Cl.² ............................................. F16K 25/00
[52] U.S. Cl. ................................. 137/454.5; 251/172; 251/269; 251/288; 251/333
[58] Field of Search .......................... 137/454.5, 454.6; 251/172, 268, 269, 333, 288

[56] References Cited

U.S. PATENT DOCUMENTS

| 2,703,584 | 3/1955 | Mix ................................. 137/454.6 |
| 2,876,988 | 3/1959 | Mornard .................... 137/454.5 X |
| 3,006,361 | 10/1961 | Reinemann ...................... 137/454.5 |
| 3,082,786 | 3/1963 | McLean .......................... 137/454.5 |
| 3,232,314 | 2/1966 | Koester ....................... 251/172 X |
| 3,913,612 | 10/1975 | Tolnai ............................ 137/454.6 |

Primary Examiner—Harold W. Weakley
Attorney, Agent, or Firm—Flam & Flam

[57] ABSTRACT

A closure head of a plumbing valve engages a protruding bead formed around one opening of a hollow highly flexible sealing member. Supply fluid is conducted to the interior of the sealing member through another opening. The hollow sealing member provides a flexible lip surrounding the bead, the lip responding to pressure of the supply to urge the bead firmly into engagement with the closure head. The lip deflects upon engagement with the closure head and its inner side is free of restraints that would prevent deflection. Limits are placed upon movement of the head while no effective limits are placed upon deflection of the lip. A lip around the supply port to the sealing member also effects a static seal. The sealing member is snap fitted into the bottom of a removable cage.

7 Claims, 5 Drawing Figures

WASHERLESS CARTRIDGE VALVE FOR FAUCETS

FIELD OF INVENTION

This invention relates to plumbing valves for water faucets or fixtures.

BACKGROUND OF THE INVENTION

A valve for plumbing fixtures desirably is made of relatively few and easily replaceable parts. Ideally the valve is so designed that the operative seal element has virtually no wear so that the user is rarely concerned with maintenance.

Typical prior art valves utilize washers that are interposed between relatively rotating parts. Wear is virtually irresistible under the grinding action. One known valve structure utilizes a rotary but non-rising stem that, by lead screw engagement, reciprocates a non-rotary closure between open and closed positions. While this washer clamped between the parts need not resist grinding action, it is still subjected to high compressive stresses. If subjected to heat while compressed, the washer may take on a heat set with corresponding loss of flexibility and sealing characteristics.

The primary object of the present invention is to provide a simple light touch valve arrangement in which excessive compressive and abrasive stress are largely eliminated.

SUMMARY OF THE INVENTION

In order to accomplish the foregoing objective, I provide a hollow sealing member of the type shown in my prior U.S. Pat. No. 3,913,612, issued Oct. 21, 1975 and entitled ECCENTRIC SHEAR SEAL CARTRIDGE VALVE. The sealing member has a lip or bead surrounding one opening to its hollow interior, the lip or bead being directly engaged by an axially movable stem to establish a seal as the sealing member undergoes limited deflection. The only forces opposing the stem are the resilience of the sealing member and the internal water pressure. Since there is no rigid backing for the sealing member directly to oppose the stem, high compressive stresses are precluded. An effective seal is provided. A light touch operation results.

In a preferred form of the invention, the closure is non-rotary and actuated by a non-rising lead screw actuator so that there is no abrasion whatsoever between the closure and the sealing member.

BRIEF DESCRIPTION OF DRAWINGS

A detailed description of the invention will be made with reference to the accompanying drawings wherein like numerals designate corresponding parts in the several figures. These drawings are to scale.

DETAILED DESCRIPTION OF PREFERRED EMBODIMENT

The following detailed description is of the best presently contemplated modes of carrying out the invention. This description is not to be taken in a limiting sense, but is made merely for purposes of illustrating the general principles of the invention since the scope of the invention is best defined by the appended claims.

Structural and operational characteristics attributed to forms of the invention first described shall also be attributed to forms later described, unless such characteristics are obviously inapplicable or unless specific exception is made.

Figure 1:
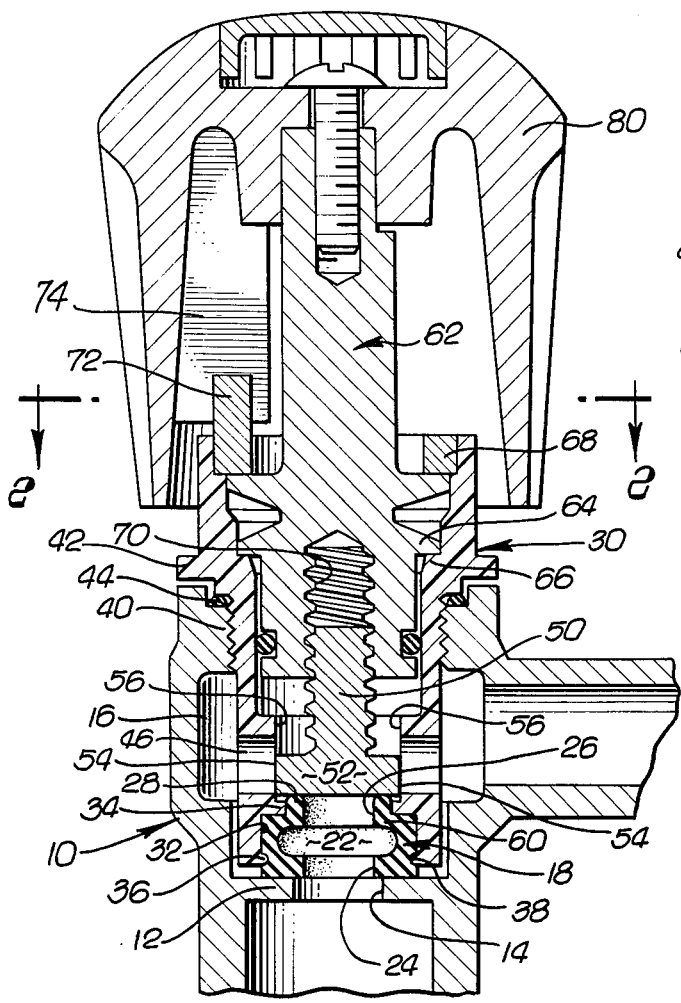
FIG. 1 is an axial sectional view of a valve incorporating the present invention.
Figure 3:
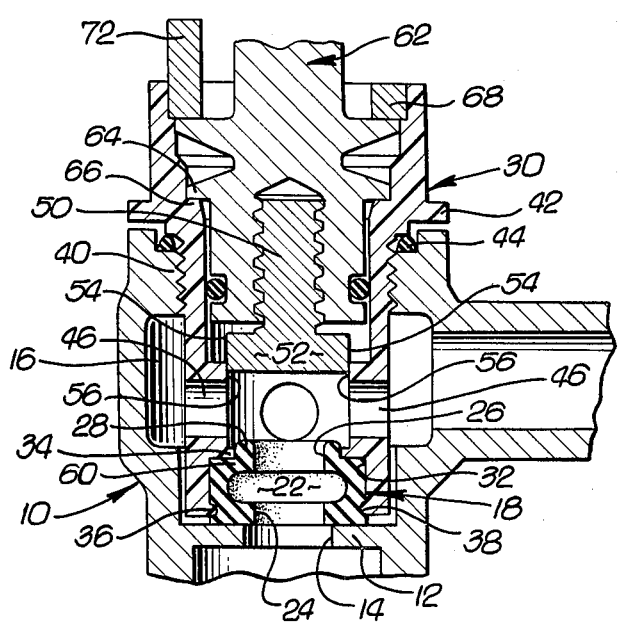
FIG. 3 is a view similar to FIG. 1, but showing the valve in open position.

In FIG. 1 a valve body 10 is illustrated that, in the present instance, typically supports a hot water valve at the left end and a cold water valve at the right end. Only one of the valves is shown. A supply conduit (not shown) is attached beneath the body 10 for registry with a ported wall 12. Water enters through port 14 in the wall 12 and into an enlarged chamber 16 (FIG. 3). Water from the chamber may then flow laterally to the center of the body for discharge through a suitable spout (not shown).

The body port 14 is sealed from above by a sealing member 18 made of flexible neoprene or other rubberlike material. The sealing member has a cylindrical exterior surface and an enlarged internal atrium or antechamber 22 between its lower opening 24 and its upper opening 26. A bead 28 protrudes about the upper opening 26.

The lower end of the sealing member 18 is clamped against the ported wall 12 by the aid of a hollow cage or bonnet 30 inserted into the chamber 16. The cage 30 may be made of suitable plastic material. The lower end of the cage has a downwardly facing recess 32 into which the sealing member 18 is snap-fitted. Thus the cage 30 has, at the top of the recess, an internal flange 34 through which the lip or bead 28 projects. Near the bottom of the recess 32 is a bead 36 that fits a corresponding groove 38 in the sealing member 18 whereby a snap fit is achieved. With the sealing member 18 in place, its lower end projects beyond the lower end of the cage 30 for engagement with the ported wall 12. The compressive sealing force between the wall and the sealing member is applied largely through the bead 36 so that the upper portions of the sealing member are free of stress for purposes hereinafter to be described.

In order to clamp the sealing member 18 against the wall 12, the cage 30 has a screw thread engagement with the body. For this purpose, the body has an internally threaded neck or nipple 40 above the chamber 16 that engages exterior threads of the cage. A peripheral flange 42 of the cage opposes the top of the neck and forms the limit to downward cage movement. A suitable seal between the sealing member 18 and the ported wall 12 is established before the flange 42 engages. An O-ring 44 fits between the neck 40 and the cage 30 to establish a seal at the top.

Figure 2:
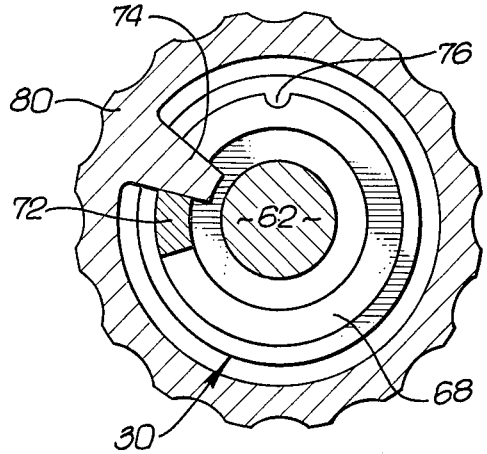
FIG. 2 is a transverse sectional view taken along a plane corresponding to line 2—2 of FIG. 1.

Water entering the sealing member 18 passes into the hollow cage and exits via peripheral openings 46 to the chamber 16. In order to control flow through the sealing member, a closure 50 is provided. The closure 50 has a bead 52 with opposite sides 54 that are flat. The flat sides 54 fit correspondingly flat, parallel internal walls 56 of the cage 30. The closure 50 is accordingly guided for longitudinal, non-rotary movement towards the bead 28. When the closure 50 engages the bead 28, (FIG. 2) the top of the sealing member 18 deflects and undergoes very slight, if any compression. This is made possible by the atrium or ante-chamber 22 which provides an upper lip 60 on which the bead 28 is formed. The bead, however, could be formed on the closure head. In any case, the parts engage near the distal edge of the lip to cause deflection. Pressure in the atrium 22 acts as soon as flow is interrupted to urge the lip 60 into firm contact with the closure head 52. The action of the valve is positive, but the touch is light. Shutoff is achieved before the head is stopped by the flange 34. Since the force necessary to seat the sealing member to the wall 12 is independent of the top of the sealing member, high flexibility of the lip is ensured.

In order to move the closure between the open and closed positions in a path generally parallel to the axis of the opening 26 as shown respectively in FIGS. 3 and 1, a rotatable actuator or stem 62 is provided that is piloted in the cage 30. For this purpose, the stem has a collar 64 that rests on an internal shoulder 66 of the cage 30. The collar 64 is confined by a retainer ring 68 (see FIG. 2) attached to the top of the cage 30. The stem has a lead screw recess 70 in its lower end that engages the lead screw shank portion of the closure 50 whereby the closure 50 advances as the stem is rotated.

Preferably the stem is stopped from rotating before the closure engages the flange 34. Otherwise excessive stresses might be built up through the mechanical advantages of the screw arrangement. For this purpose, the retainer ring 68 has an upwardly extending stop 72 that cooperates with a radial projection 74 on the inside of a decorative handle 80. The stop 72 is located by a key 76 formed on the inside of the cage 30 and that fits the retainer ring 68.

DESCRIPTION OF ALTERNATE EMBODIMENT

Figure 4:
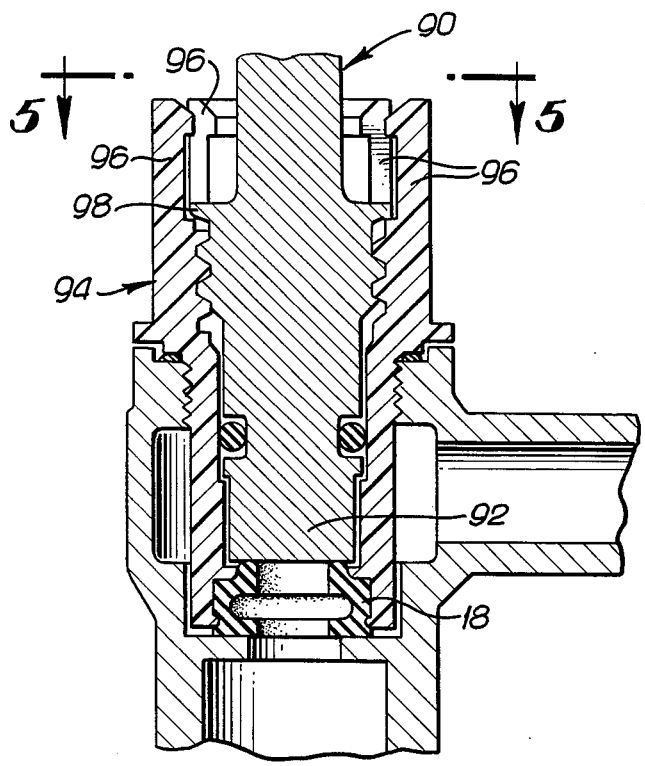
FIG. 4 is an axial sectional view similar to FIG. 1, but showing another embodiment of the invention.
Figure 5:
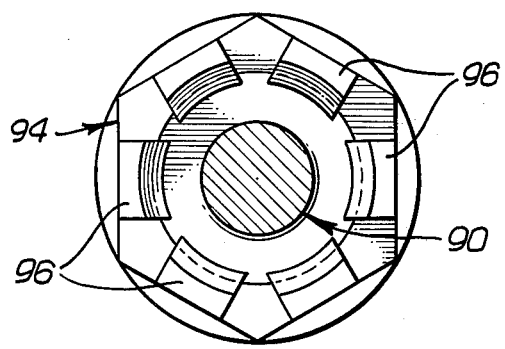
FIG. 5 is a transverse sectional view taken along a plane corresponding to line 5—5 of FIG. 4.

In the form of the invention shown in FIGS. 4 and 5, an actuator or stem 90 is provided that includes at its inner end a closure part 92 engageable with the sealing member 18. Except for the fact that the closure rotates, the operation is the same. Since the sealing member deflects and is not compressed at the area of the bead, there is no appreciable abrasive force imposed. Hence the long life characteristic of the sealing member 18 engaged by a rotary closure approaches the characteristic of the sealing member engaged by a nonrotary closure.

In the present instance, the cage 94 has a series of snap fingers 96 at its top which deflect laterally upon assembly of the stem. The stem has a flange 98 that deflects the fingers upon assembly. The flange 98 by engagement with the under surfaces of the fingers, limits the retracting movement of the stem.

Intending to claim all novel, useful and unobvious features shown or described, I make the following claims:

1. In a valve structure for a plumbing fixture or the like:
   a. means forming a valve body having an inlet port and an outlet passage;
   b. a hollow sealing member made of flexible material confined against the body and having a first opening registering with said body inlet port, said sealing member having a second opening entirely surrounded by a flexible lip capable of deflecting inwardly of the sealing member;
   c. closure means having a head;
   d. means guiding said closure head for movement in a path substantially parallel to the axis of said second opening to engage said lip near the said second opening so that said lip deflects upon engagement between said lip and said closure head;
   e. said body outlet passage and said second sealing member opening being in communication when said closure head is away from said sealing member;
   f. means independent of said sealing member for limiting movement of said closure head beyond initial engagement with said sealing member; and
   g. the supply pressure inside said sealing member urging said lip into said engagement with said closure head while said lip is free of high compressive stress.

2. The combination as set forth in claim 1 in which a bead is formed between said closure head and said second sealing member opening.

3. The combination as set forth in claim 1 together with lead screw means for advancing said closure means whereby said closure means is non-rotary.

4. The combination as set forth in claim 1 together with a cage removably mounted in said valve body, said sealing member being fitted to the inner end of said cage, said cage having means for applying a compressive seating force between said sealing member and said body port substantially independently of said lip.

5. The combination as set forth in claim 4 in which said cage and said sealing member have means forming a snap fit connection therebetween located at a place spaced from the proximal portion of said lip.

6. In a valve structure for a plumbing fixture or the like;
   a. a valve body having a chamber, said body having a supply port opening into the bottom of the chamber;
   b. a cage detachably secured to said body to project into said chamber, said cage having a recess at its lower end;
   c. a hollow sealing member made of flexible material and fitted into said recess, said sealing member being confined by said cage against the body and having a first opening registering with said body supply port;
   d. said sealing member having a second opening surrounded by a lip located at the bottom wall of said cage recess, there being an opening at the bottom of said cage recess registering with said second opening;
   e. closure mounted by said cage on the other side of said bottom wall and having a head movable towards and away from said bottom wall, said closure head and said lip being engageable with each other through said bottom wall and near the distal end of said lip for deflection of said lip upon engagement;
   f. means independent of said sealing member for limiting movement of said closure head beyond initial engagement with said sealing member; and
   g. the supply pressure inside said sealing member urging said lip into sealing engagement with said closure head while said lip is free of high compressive stress.

7. The combination as set forth in claim 6 together with screw thread means for moving said closure towards and away from said bottom wall whereby said closure is nonrotary.

* * * * *